United States Patent
Zheleznyakov

(10) Patent No.: US 7,172,504 B2
(45) Date of Patent: Feb. 6, 2007

(54) METHODS FOR PLAYING A QUESTION AND ANSWER GAME

(76) Inventor: Nikolai Aleksandrovich Zheleznyakov, pl. Pobedy, 1"B"-101, Moscow (RU) 121170

( * ) Notice: Subject to any disclaimer, the term of this patent is extended or adjusted under 35 U.S.C. 154(b) by 260 days.

(21) Appl. No.: 10/514,304

(22) PCT Filed: May 23, 2002

(86) PCT No.: PCT/RU02/00247

§ 371 (c)(1),
(2), (4) Date: Nov. 12, 2004

(87) PCT Pub. No.: WO03/097190

PCT Pub. Date: Nov. 27, 2003

(65) Prior Publication Data

US 2006/0068862 A1    Mar. 30, 2006

(30) Foreign Application Priority Data

May 16, 2002   (RU) .............................. 2002112836

(51) Int. Cl.
*A63F 9/24* (2006.01)
(52) U.S. Cl. .......................................... 463/9; 463/10
(58) Field of Classification Search .................... 463/9, 463/10; 273/430
See application file for complete search history.

(56) References Cited

U.S. PATENT DOCUMENTS 5,274,610 A * 12/1993 Tonomura et al. ............ 368/10
6,018,719 A * 1/2000 Rogers et al. ................ 705/24
6,856,986 B1 * 2/2005 Rossides ........................ 707/1
7,076,434 B1 * 7/2006 Newnam et al. ............... 705/1

FOREIGN PATENT DOCUMENTS

| RU | 2124753 | 1/1990 |
|----|---------|--------|
| RU | 2138310 | 9/1999 |
| RU | 2148546 | 5/2000 |
| WO | 01/86573 | 11/2001 |
| WO | 02/17177 | 2/2002 |

* cited by examiner

*Primary Examiner*—Eugene Kim
(74) *Attorney, Agent, or Firm*—patenttm.us; James H. Walters

(57) ABSTRACT

The inventive method consists in marking sold articles with codes and storing them in a server database. Questions and answers are formed and transmitted to user devices. A random code is produced and compared with a user code. The number (N) of questions is determined according to an expression $N=S-M+k$, wherein S is the total number of symbols in the sequence of the random code, M is a number of coincided symbols in the sequence of random and user code, k is a whole number. The operations of transmitting questions from the server and receiving correct answers from the user device are repeated, the number of transmitted questions and received correct answers being limited according to said mathematical expression. The played user codes are stored in the server database in order to prevent the participation thereof in following draws.

14 Claims, 2 Drawing Sheets

METHODS FOR PLAYING A QUESTION AND ANSWER GAME

FIELD OF THE INVENTION

The invention relates to question and answer games and may be used when conducting interactive competitions, quizzes, entertainment and cognitive games for a great number of remote users of a network preferable the Internet.

PRIOR ART

Known in the art is a method of conducting an interactive competition, where the rules of the said competition are transmitted to remote users by way of transmitting information messages from the interactive competition center, sending them to users' devices, remote users are registered as participants of the said competition, a message on starting the competition is transmitted to the participants of the said competition from the interactive competition center, data exchanges are carried out between users' terminals and the interactive competition center in the process of doing the tasks of the said competition, the results of participating in the competition are evaluated in the interactive competition center for all the participants (RU, A, 2124753).

In the above method a telecommunication network node is used as the interactive competition center. Remote users are logged on via a telecommunication network to the telecommunication network node ensuring the interactive competition. In the process of doing the tasks of the said competition the synchronous participation of all the remote users in the interactive competition is ensured. All the participants of the competition are simultaneously given tasks containing questions and variants of answers from which at least one answer is correct. All the participants of the competition are simultaneously allotted one and the same limited time interval for giving an answer to each task of the said competition by choosing the corresponding variant of an answer. While receiving messages containing the chosen variants of answers, the said node records for each task of the said competition the variants of answers received from each participant of the said competition. The results of the participants of the said competition are evaluated directly after receiving in the said node the chosen variants of answers for each task given by determining the score for the corresponding task of the said competition and allotting to each participant of the said competition, who has chosen the correct variant of answer, a number of points proportional to the said score of the said competition task.

An advantage of holding competitions with the use of a telecommunication network is the possibility for any user having a personal computer or a device for connecting to a network (a workstation, a TV-set, a personal digital assistant, a phone, etc.) of real-time participating in a quiz together with many other users.

The limitation of the known method is evaluating the fulfilled competition tasks with regard to their complexity. In any case, such evaluation will be subjective, since the complexity level of tasks and questions is determined by the game organizers. Furthermore, the field of a question mat relate to the professional activities of a game participant, which results in his/her obtaining a higher score in comparison to the other game participants. When holding a quiz, all the competition participants are simultaneously given an equal number of questions and answers, and that results in the fact that a participant having certain knowledge in a definite field, to which asked questions relate, as well as certain professional knowledge becomes the winner. When holding such a question and answer game, the element of chance is missing, which lowers excitement and interest in the game. Such a game is in no way connected with advertising goods and services, and that leads to lack of interest from the side of manufacturers of various products in holding it.

Known in the art is a method of holding a quiz via a network, comprising receiving information from a user's device, storing information about the respective user in a server data base, provision the quiz with a page containing control questions for users, receiving an answer for the quiz from a user's device, comparing the answer received from the user's device with the correct answer, inputting and storing the quiz results (WO 0186573, G 06 F 19/00, pub. 2001).

In that method the server's page is provided with advertisements enabling to combine a quiz and goods advertising, which results in the interest of manufacturing companies in holding a quiz.

The limitation of the above invention is that the relation between advertisements and the quantity of goods sold is missing, which does not stimulate a user to buying various products on sale, since he/she does not directly participate in a quiz and are in no way connected to its results.

At the same time, as known from the trade practice, holding of simple lotteries of goods on sale, which are marked differently, is of pure random character, limits the number of participants and winners of such lotteries, and is in no way connected to improving the scope of mental outlook, erudition and intellectual level of goods users. Moreover, being victorious in a lottery is usually connected to the coincidence of certain users' numbers (number of their lottery tickets or labels on goods on sale) with "lucky" numbers determined randomly, without asking any questions to the participants in a lottery. The coincidence of numbers is usually calculated by a probabilistic approach, therefore the manufacturer of certain goods roughly knows what number of goods should be sold for repaying a lottery of goods on sale. But holding of usual advertising campaigns for various lotteries is obtrusive for users. In virtue of a pure chance of being victorious, such lotteries raise doubts in users with respect to the possibility of getting any of the prizes raffled.

DESCRIPTION OF THE INVENTION

The present invention is based on the objective to create a method of playing a question and answer game (quiz) where, with the use of a telecommunication network, asking questions and receiving answers would be connected to sales of goods in such a way that to increase the number of quiz participants according to a number of goods bought by them, raise the interest in both holding the quiz itself and buying ever new goods without usual advertising means directly on the server page, and, thus, improve the entertaining character of a quiz when selling various goods, provide goods with indirect advertising, expand the means available for advertising goods on sale, ensure the possibility of holding quizzes and realizing prizes depending on the erudition of quiz participants and, at the same time, depending on the quantity of the goods bought by them, decrease the competition element directly between the players depending on their professional knowledge.

In order to achieve the set objective this method of playing a question and answer game includes:

marking products on sale with codes individual and non-repeatable on the products on sale and composed of symbols each of which is arranged in a consecutive order;

storing the codes of goods on sale in a data base of a server with the installed game software;

forming and storing in the data base of the server questions and answers for them, for each question several answers being formed, only one of them is correct;

generating a random code having certain symbol number and types corresponding to the number and types of symbols included in codes of products on sale; storing the said random code in the server;

storing in the server data base information on a user's device logged on through a network to the server, and identification of the user;

receiving from a user's device and storing in the server at least one of users' codes transmitted by the user's device; the user's code should correspond to the code of a product on sale;

checking the relevancy of the user's code, namely: whether it corresponds to the code of a product on sale and whether it participated in previous games; if the user's code is different from the code of a product on sale or if the user's code participated in previous games, the game with this user's device is interrupted, but if the user's code corresponds to the code of a product on sale and did not participate in previous games, the game with this user's device continues;

comparing the random code with the user's code for the purpose of determining the order of positions of the same symbols in the random code with the consecutive order of positions of symbols in the user's code; if at least one coincidence of the same symbol in its position in the random code sequence with the position of the same symbol in the user's code sequence is available, from the server data base is randomly extracted at least one question together with the answers for it, only one of them being correct, and transmitting this question together with the answers to the user's device;

the total number N of questions, which are transmitted to a user's device from the server, is connected to the number of coincidences of the position order of random code same symbols in their sequence in accordance with the mathematical expression:

$N=S-M+k$, where

S—total number of symbols in the random code sequence;

M—number of coincided symbols in the sequences of the random code and the user's code;

k—an integer;

receiving in the server from a user's device via a network an answer, checking its correctness in the server, if the answer is correct, the next question, randomly selected from the server data base, being sent to the user's device; but if the answer is incorrect the transmission of questions is interrupted while storing in the server data base the user's code participating in the game for the purpose of excluding it by the server from participation in next games; if the answer is correct, the next question as chosen from the server data base, together with answers, one of them being correct, is transmitted from the server via the network;

the operations of transmitting questions by the server and receiving correct answers from the user's device are repeated, while limiting the number of transmitted questions and received correct answers in accordance with the above mathematical expression;

if correct answers have been given to all the questions, the number of which is determined in accordance with the above mathematical expression, then a message on victory is formed in the server, and such a message is transmitted via the network to the user's device, while storing this user's code in the server data base for the purpose of excluding its acceptance by the server and participation in next games.

Additional variants of implementing the inventive method are possible, where it is expedient that:

questions together with answers are transmitted to a user's device in the form of images of questions and answers on the server page and/or their sound recording;

figures are used as symbols;

letters are used as symbols;

images are used as symbols;

in storing codes of products on sale in the data base of the server with the installed game software, the type of a product for sale is stored in addition, which should be entered into the code in the form of a definite preset symbol, and when checking the relevancy of a user's code to the code of products on sale in the server, the user's code is additionally checked for its compliance with the definite preset symbol; and if the definite preset symbol from the user's code is different from the definite preset symbol for the type of a product for sale, then the game with that user's device is interrupted, and if the definite preset symbol of the user's code corresponds to the definite preset symbol of that product for sale, then the game with that user's device continues;

a personal computer with a modem is used as the user's device;

equipment of the interactive television is used as the user's device;

a phone equipped with means for connecting to the Internet is used as the user's device;

a random code is stored in the server within a preset time interval; after which another random code should be randomly generated, having the symbols number and type that correspond to the number and types of code symbols of the products for sale, and that another random code is stored in the server;

the time for transmitting a reply from the user's device to the server should be limited by a preset value, and an additional message should be introduced, informing about the limitation of the time, when transmitting a question from the server to the user's device;

food stuffs are used as products on sale;

printed matter is used as products on sale;

garments are used as products on sale.

The set objective has been fulfilled and a technical result has been achieved due to marking of the products on sale with codes, generating a random code, comparing a user's code with the random code, putting questions before a user in dependence with the number of coinciding symbols in the user's code and the random code, as well as storing users' codes, which have participated in the game, in the server data base.

The stated advantages as well as the peculiar features of this invention will be further explained by its preferred embodiments together with references to the appended drawings.

BRIEF LIST OF THE DRAWINGS

DESCRIPTION OF THE PREFERRED EMBODIMENT

The claimed method for playing a question and answer game may be implemented with the use of any system for connecting a user's device to a server via the Internet, therefore this well-known system of connecting, e.g., through providers at the electronic address of a server, is not described in this application. The method may be implemented when holding interactive games for a great number of remote users via telecommunication networks. For example, a personal computer with a modem, or equipment for interactive television, or a phone provided with means for connecting to the Internet, or any other equipment provided with means for connecting to a server via the Internet and with means for receiving and displaying information by the user may be used as a user's device.

Figure 1:
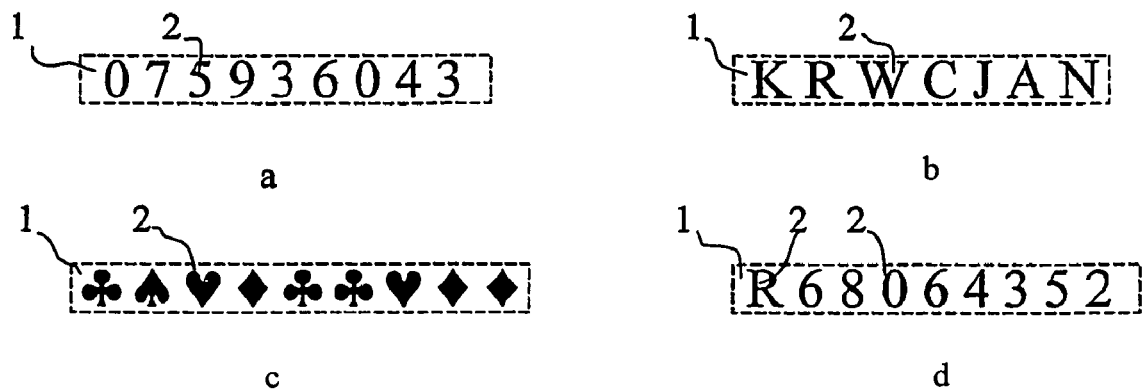
FIG. 1 shows possible variants of codes for marking products for sale: a—as figures, b—as letters, c—as an image, d—as a letter and figures.

The method of playing a question and answer game includes, first of all, marking the products on sale with codes 1 (FIG. 1), which are individual and unique for the products on sale and are composed of symbols 2. Each of symbols 2 is consecutively ordered one by one.

Figures (FIG. 1a), letters (FIG. 1b) or images (FIG. 1c) may be used as symbols 2. Mixed use of various types of symbols, e.g., letters and figures (FIG. 1d), is also possible.

As products on sale absolutely different products may be used, e.g., food stuffs (sausage, cheese, vine, bread, etc.), printed matter (books, magazines, notebooks, etc.) or garments (suits, blouses, shoes, etc.) or household appliances (refrigerators, washing machines, mixers, coffee-makers, etc.). The products on sale are marked with codes 1 by, e.g., sticking labels with codes made on them to the packages of the products on sale. After a buyer acquires even one marked product, he/she may participate in the announced game.

All the codes issued by the manufacturer for products on sale are stored in the data base of the server with the installed game software. In this case a mixed marking of products on sale is possible (FIG. 1d), e.g., by letters and figures, where a letter denotes the type of a product for sale. For example, letter A denotes dairy food stuffs, letter R denotes shoes, letter Z denotes household appliances. The other symbols 2, e.g., figures, are used for coding the products on sale in a consecutive order. The number of symbols 2 may be quite different and is determined, mainly, by the total quantity of the products on sale. The type of coding is determined by the game organizers.

Questions and answers for the, are formed in the data base of a server. For each question several answers are formed, e.g., four or five, only one of them is correct. The data base containing questions and answers may be formed by the game organizers or directly by players. If the data base is formed by the players, they send their questions together with variants of correct and incorrect answers to the server. The game concept does not presupposes a competition between the players and is not of competition nature, therefore questions may have different complexity and relate to absolutely different fields of knowledge (history, geography, literature, mathematics, etc.).

A random code 3 having the number and the type of symbols 2, which correspond to the number and the type of symbols 2 used in codes 1 of the products on sale (FIG. 2–5), is randomly generated in the server. This random code 3 is stored in the server. A random code 3 in the server is stored for a definite period of time, e.g., for a day, week, decade, month. The time interval for a random code 3 for its application is determined by the game organizers.

After the expiration of the application period of the first random code 3 another random code 3 having some number and type of symbols 2, which are also correspond to the number and the type of symbols of codes 1 for the products on sale, is randomly generated. That another random code 2 is stored in the server for using it in the next game. Thus, the products that have been bought earlier may participate in the game at its any stage, which is important for increasing customer demand for various goods.

Several variants of generating a random code 3 are possible. For example, each week the game organizer announces a random code 3 (number) for the current week. The code is determined randomly, with the use of a lottery drum during a TV-show on air, or by any other method. From the time of announcement the former random code 3 loses its game features, and the new random code 3 is considered as winning till the beginning of the next TV-show, which will determine a new winning random code 3.

Moreover, a specific random code 2 valid in a given time interval may not be announced by the game organizers beforehand. The user of a user's device (e.g., a personal computer) may know it only after inputting on the server at least one his/her user's code 4. (In the present invention under the term "user's code 4" is understood the code 1 of a sold and bought product, which that player inputs on the server.) Therefore, it is advantageous for a player to buy several products of the same type in order to know whether it is worth for him to play his user's code 4, since the claimed method of playing a question and answer game (interactive competition) is based on a random event, e.g., coincidence of the number and location of symbols 2 of a random code 3 and symbols 2 of the code 1 used on the product bought by him.

In order to play the game with a particular user data on the user's device connected to the server via a network is stored in the data base, after which the user's identification is checked. The player is allotted a personal identification number (PIN-code). In such a case new players are registered in the player data base of the server, and the players, who participated in the game earlier, may use their PIN-codes already allotted to them.

Then at least one of the user's codes 4, as transmitted by the user's device of a player, is received from the user's device and stored in the server. (The user's code 4 should correspond to the code 1 of the products on sale, which have been bought by that player.) The user's code 4 is checked for relevancy to the code 1 of one of the products on sale for the purpose of determining whether that user's code 4 participated in previous games. If the user's code 4 by its configuration, e.g., by the total number of the used symbols 2 or by a certain preset symbol (known to the game organizers), e.g., by the letter coding the type of the product, as stated in a definite position of the sequence of the code 4, is different from the code 1 of the products on sale, then the game with that user's device is interrupted. If a user's code 4 has already participated in previous games, then the game with that user's device is also interrupted. If the user's code 4 corresponds to the configuration of one of the codes used for the products on sale and if that user's code 4 has not participated in the previous games, then the game with that user's device continues. Due to fulfillment of the described operations the participation in the game of earlier played users' codes 4 (and, correspondingly, codes 1 of the products on sale) or codes entered by guess and not-peculiar to a given type of products is excluded.

Figure 2:
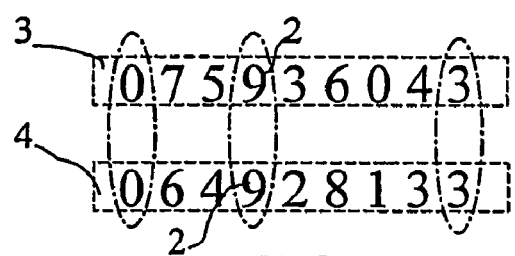
FIG. 2 shows an example of comparing whether the symbols of the user's code and the random code coincide.
Figure 3:
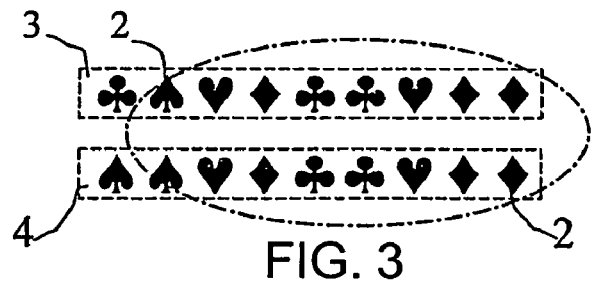
FIG. 3 shows another example in accordance with FIG. 2.
Figure 5:
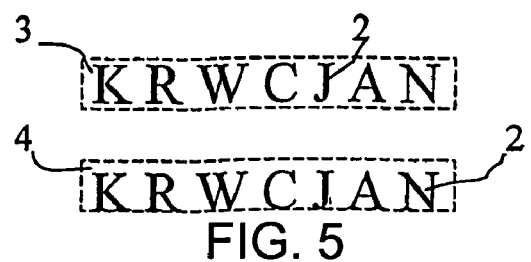
FIG. 5 shows another example in accordance with FIG. 2.

The random code 3 is compared with the user's code 4 to check whether the order of the positions of the same symbols 2 of the random code 3 corresponds to the sequence order of the positions of the same symbols 2 of the user's code 4 (FIGS. 2, 3, 5). If there is at least one coincidence of the same symbol 2 in its position in the sequence of the random code 3 with the position of the same symbol 2 in the sequence of the user's code 4 from the server data base in the random manner or in the order of their location in the server data base, the respective question together with the stored answers for it (only one of them is correct) are extracted. That question together with the answers is transmitted via a network to the user's device.

FIG. 2 shows three coincidences of the positions of symbols 2, i.e., figures in 9-digit number of the random code 3 and the user's code 4. FIG. 3 shows eight coincidences of symbols 2, i.e., images of suits of playing cards of the random code 3 and the user's code 4, when the total number of symbols 2 in one of the codes is nine. The coinciding symbols 2, for the purpose of easier reading the figures are enclosed in an oval. FIG. 5 shows the full coincidence of the positions of symbols 2, i.e., letters of the random code 3 and the user's code 4 when the total number of letters used in one of the codes is seven.

Figure 4:
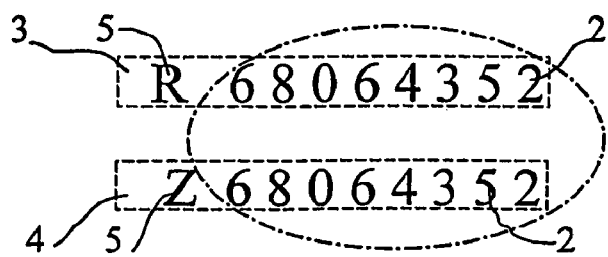
FIG. 4 shows another example in accordance with FIG. 2.

FIG. 4 shows the situation described above, when the positions of several symbols 2. i.e., letters, coincide, but the type of the goods coded by symbol 2, i.e., by a letter, does not coincide. That user's code 4 may not participate in the game. For the exclusion of entering illegal users' codes 4 for types of goods on sale when storing the codes 1 of the products on sale the type of the product on sale is stored also, which is entered in the code 1 as a definite preset symbol 5, e.g., a letter, a sign, etc. When checking the relevancy of a user's code 4 to the code 1 of the product on sale, an additional check is performed in the server in order to determine whether it complies with the definite (set by the game organizers) symbol 5 (its location and designation). If the definite preset symbol 5 in the user's code 4 is different from the definite preset symbol 5 for the type of the product on sale, then the game with that user's device is interrupted. If the definite preset symbol 5 of the user's code 4 corresponds to the definite preset symbol 5 of the product on sale, then the game with that user's device continues. The variant shown in FIG. 4 may be used by the game organizers for delimiting quizzes according to types of products on sale as well as for further excluding the possibility of unfair (without buying goods) entering into the game or entering by guess.

A specific feature of the claimed game is that the total number N of questions transmitted to a user's device from the server is connected to the number of coincidences of the position order of the same symbols 2 of a random code 3 in their sequence and the number of coincidences of the position order of symbols 2 of the user's code 4 in their sequence in accordance with the mathematical expression:

$$N=S-M+k, \text{ where}$$

S—total number of symbols in the sequence of a random code 3 (and, respectively, exactly the same in the sequence of a user's code 4);

M—number of coincided symbols in the sequences of the random code 3 and the user's code 4;

k—an integer (e.g., 0 or 1 or 2 or 3, etc up to any K).

The number k is set by the game organizers and in the simplest cases may be equal to "1", when a participant of the game, if all the symbols 2 of the random code 3 and the user's code 4 fully coincide, is asked only one question.

Thus, for example, FIG. 2 shows three coincidences of symbols 2 of the random code 3 and the user's code 4. M=3, S=9. Therefore, at k=1 the total number N of questions asked by the server from that user's device will be N=9−3+1=7.

In the example shown in FIG. 3 there are eight coincidences of the positions of symbols 2 of the random code 3 and the user's code 4 (M=8), and the total number of symbols 2 in the sequence is nine (S=9). Therefore, at k=1, the total number N of questions asked by the server from that user's device will be N=9−8+1=2.

In the example shown in FIG. 5 the total number of symbols 2 in the sequence of the codes 3 and 4 is seven (S=7), and they all coincide (M=7). Therefore, at k=1, the total number N of questions asked by the server from that user's device will be N=7−7+1=1.

Thus, the greater is the number of coinciding positions of symbols 2 in their sequences of the random code 3 and the user's code 4, the lesser number of questions is asked from that quiz player. Thus, apart from the random character of asking questions in the game and their number, when realizing the claimed game it is also possible that a user of a user's device, who is a man with great erudition, will be victorious, in spite of coincidence of only a small number of symbols 2 (even one symbol 2) in the sequence of the code 1 of the products on sale (the goods bought by him/her) with a random code 3.

At k=0 the user of a user's device, when all symbols 2 in the sequences of the random code 3 and the user's code 4 coincide, has the possibility not to answer questions and get a prize, and the user of a user's device, who has correctly answered all N questions, the number of which is determined in accordance with the above mathematical expression, may get a prize exactly equal as to its value.

For the purpose of evaluating the correctness of answers one answer, e.g., the number of a question, is received by the server from the user's device via a network, and its correctness is evaluated in the server. If the answer is correct, the next question, which is selected from the server data base randomly or in the consecutive order of the questions in the data base, is transmitted to the user's device. If even one answer is incorrect, the transmission of questions is interrupted. If an answer is incorrect, the user's code 4, which has participated in the game, is stored in the server data base for the purpose of excluding its acceptance by the server and participation in next games. If an answer is correct, the next question, which is selected from the server data base, is transmitted from the server to the user's device together with answers, one of them being correct.

The operations of transmitting questions by the server and receiving correct answers from the user's device are repeated. In such cases the number N of transmitted questions and received correct answers is limited in accordance with the above mathematical expression. Furthermore, the time for transmitting answers from a user's device to the server may be limited by a preset value, e.g., 2 or 10 minutes, in order to shorten the total time available for holding a quiz and in order the user of a user's device may not take encyclopedic literature or reference books. An additional message should be introduced, informing about the limitation of the time, when transmitting a question from the server to the user's device, where the specific time interval for sending back an answer is stated.

In a case where correct answers have been given for all questions, which number N is determined in accordance with the above mathematical expression, a winning message is formed in the server, e.g., a message on the number of points won by that player or on awarding the prize to him/her. That message is transmitted from the server to the user's device, and that played user's code 4 is stored in the server data base for the purpose of excluding its acceptance by the server and participation in next games.

Figure 6:
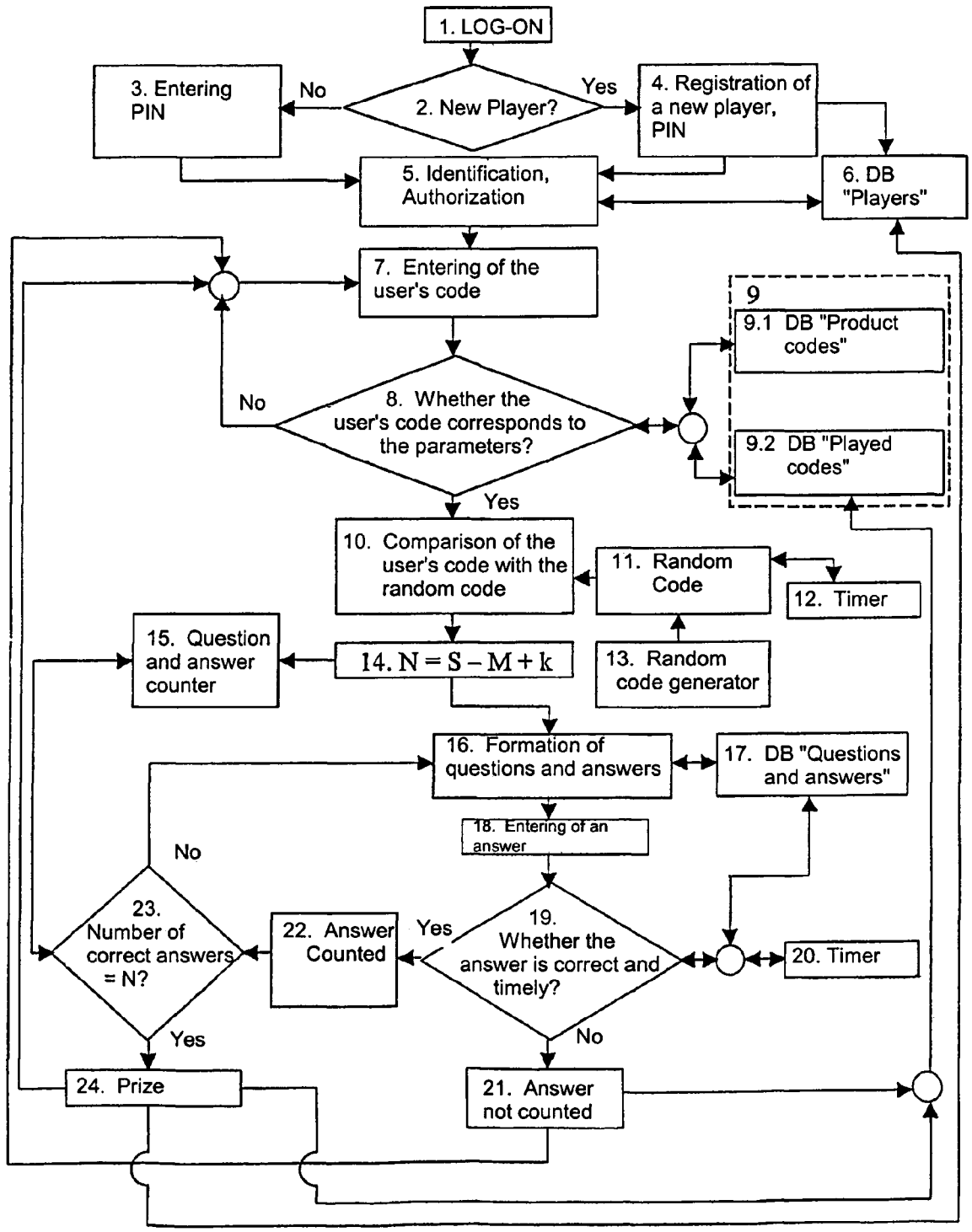
FIG. 6 shows a schematic diagram of the operating algorithm of the server software.

For the implementation of the claimed method the following schematic diagram of operating the server may be used (see FIG. 6).

The block 1 is the arrival of a player in the game system, where the user of a user's device is invited to enter the PIN-code or register.

The logical block 2 presents two options: either the player is a newcomer (not registered) or the player has already been registered in the system and has hi/her PIN-code.

If a player is already registered in the system, all he needs to start game is to enter his/her PIN-code. The PIN-code of a registered player is entered in the block 3.

If a player is a newcomer, he/she must register in the system. For this he/she is asked to complete a certain questionnaire, after which the system generates his/her personal PIN-code (block 4). In such a case the system records that new player in the Data Base "Players" (block 6).

After checking the entered PIN-code in the block 3 or after generating and entering a new PIN-code, the system performs identification and authorization of that player (block 5), communicating for this with the Data Base (DB) "Players" (block 6).

After the authorization of a player the information inviting to enter the user's code 4 is displayed on the user's device (block 7).

After the player has entered the user's code 4, the server checks the user's code 4 (logical block 8) for the compliance with codes 1 of the products on sale (according to the form and configuration of the codes). For this the system communicates with the Data Base "Codes" (block 9). The block 9 comprises two data bases, i.e., the Product Code DB (block 9.1) and the Played Code DB (block 9.2). The check is performed according to two parameters: whether the given user's code 4 (block 9.1) really exists, and whether it has played earlier (block 9.2). If the entered user's code 4 does not comply with any one of the said parameters (FIG. 4), the system issues an error message and sends the procedure back to the block 7, giving to the player the possibility of entering a new user's code 4 in the block 7.

After checking the entered user's code 4 for the compliance of the said parameters, in a case where the user's code 4 corresponds to a code 1 of products on sale and has not participated in the game earlier, the transfer to the block 10 if performed. The block 10 also receives information on the random code 3 (from the block 11). An arbitrary set of symbols 2 of the random code 3 (block 11) is formed by the random code generator (block 13), which is a definite capacity random number generator; the said arbitrary set is valid for a definite time between the preset initial time and the cut-off time, which is set by a timer (block 12), e.g., a day, a week or a month. In this case the said random code 3 is not known by players at their first entering the system. Moreover, the random code 3 may be entered into the block 11 of the server by the game organizers after holding, e.g., a TV-show where a lottery machine orderly ejects balls with figures. The positions of symbols 2 of the random code 3 from the block 11 are compared with the positions of symbols 2 of the user's code 4 coming from the block 8, where the latter code, after being checked in the block 8, has the same total number of symbols S as the random code 3 (FIGS. 2, 3, 5).

After comparing the entered user's code 4 with the random code 3 valid at this moment, the system determines the number of questions for players according to the formula N=S−M+k (block 14).

The information on the number of questions and answers is transmitted from the block 14 to the question and answer counter (block 15).

After determining the number N of questions the system forms one question and several answers (block 16), for which it is communicated with the Questions and Answers DB (block 17) displaying one of the questions and several variants of answers (one of them being correct) on the user's device.

The player selects and enters one of the answers proposed by the system (block 18).

The logical block 19 checks the answers given by the players according to two parameters: whether the answer is correct and whether this answer has been sent within the definite final set time. For this the system communicates with the Questions and Answers DB (block 17) and the timer (block 20) setting a time interval for giving an answer.

In a case where even one of the above parameters does not correspond to the set ones, the system issues an error message. The answer of the player is not counted, the block 21 routes the user's procedure to the block 7, thus giving to him/her a possibility to enter a new user's code 4. At the same time, the block 21 sends to the Played Code DB (block 9.2) the information for recording that this user's code has already played.

In a case where the answer is correct and is given in time, the system counts it (block 22) and refers to the logical block 23 for checking the compliance of the number n of correct answers with the number N of questions. If the number n of correct answers is less than the number N of questions, which is compared with the information stored in the block 15, then the transfer to the block 16 is effected. The player is asked a new question and variants of answers are given. If the number n of correct answers is equal to the number N of questions, the system sends to the user's device a winning message (block 24), makes a record in the DB "Players" (block 6) concerning allotting winning points to that player, makes a record in the DB "Codes" (block 9.2—DB "Played Codes") to the extent that the given user's code 4 has already played, and transfers to the block 7, giving the player a possibility of starting a new game and entering a new user's code 4.

For each player registered in the system a personal account may be open, where the number of prizes is recorded. Each prize (i.e., each winning user's code 4) corresponds to the played code 1 of product on sale; moreover, the player may be allotted a certain number of points, the sum of which, in its turn, may serve as a measure of the prize value. The points got for each winning user's code 4 may be summed up (this is not shown in FIG. 6, since it relates to the rules of holding a game, as set by the organizers, rather than to the essence of the claimed invention). Thus, a player victorious because of a greater number of users' codes 4, i.e., who has bought more goods with code 1, may get more valuable prize than a player, who has played only with one of the users' codes 4. This stimulates the users and the game participants to continue buying various products.

Thus, the claimed method of playing a question and answer game stimulates a user to buy as many goods having a corresponding marking as possible in order to participate in the game. For participating in the game a user should become a holder of a unique playing coupon bearing a code 1 in the form of the sequence of symbols 2. Playing coupons are distributed free, but one may get them through buying goods. In order to get prizes, players may present to the game organizers (personally or via mail) the original labels (coupons) with codes 1 of the goods bought by them.

At all this the whole process of the game (registration of participants, check of the number of coinciding symbols 2, analysis of answers given by players) is carried out in the automatic mode, which ensures the objectiveness of decisions taken and makes the game terminal permanently accessible.

INDUSTRIAL APPLICABILITY

The claimed method of playing a question and answer game may be most successfully applied industrially when it is performed via the Internet for the purpose of increasing the number of quiz participants and, accordingly, the number of goods bought by them. The method promotes the development of interest both in holding quizzes themselves and in buying ever new goods when usual means of advertising such goods are missing on the server's page in the direct form.

The invention claimed is:

1. A method of playing a question and answer game, comprising:

marking products on sale with codes individual and non-repeatable on the products on sale and composed of symbols each of which is arranged in a consecutive order;

storing the codes of goods on sale in a data base of a server with the installed game software;

forming and storing in a data base of the server questions and answers for them, for each question several answers being formed, only one of them being correct;

generating a random code having certain symbols number and types corresponding to the number and types of symbols included in the codes of products on sale; storing the said random code in the server;

storing in the server data base information on a user's device logged on through a network to the server, and identification of the user;

receiving from a user's device and storing in the server at least one of users' codes transmitted by the user's device; the user's code should correspond to the code of a product on sale;

checking the relevancy of the user's code, namely: whether it corresponds to the code of a product on sale and whether it has participated in previous games; if the user's code is different from the code of a product on sale or if the user's code has participated in previous games, the game with this user's device is interrupted, but if the user's code corresponds to the code of a product on sale and has not participate in previous games, the game with this user's device continues;

comparing the random code with the user's code for the purpose of determining the order of positions of the same symbols in the random code with the consecutive order of positions of symbols in the user's code; if at least one coincidence of the same symbol in its position in the random code sequence with the position of the same symbol in the user's code sequence is available, from the server data base is randomly extracted at least one question together with the answers for it, only one of them being correct, and transmitting this question together with the answers to the user's device;

a total number N of questions, which are transmitted to a user's device from the server, is connected to the number of coincidences of the position order of random code same symbols in their sequence in accordance with the mathematical expression:

$N=S-M+k$, where

S—total number of symbols in the random coda sequence;

M—number of coincided symbols in the sequences of the random code and the user's code;

k—an integer;

receiving in the server from a user's device via a network an answer, checking its correctness in the server, if the answer is correct, the next question, as selected from the server data base, being sent to the user's device; but if the answer is incorrect the transmission of questions is interrupted while storing in the server data base the user's code participating in the game for the purpose of excluding its acceptance by the server and participation in next games; if the answer is correct, the next question as chosen from the server data base, together with answers, one of them being correct, is transmitted from the server via the network;

the operations of transmitting questions by the server and receiving correct answers from the user's device are repeated, while limiting the number of transmitted questions and received correct answers in accordance with the above mathematical expression;

if correct answers have been given to all the questions, the number of which is determined in accordance with the above mathematical expression, then a message on victory is formed in the server, and such a message is transmitted via the network to the user's device, while storing this user's code in the server data base for the purpose of excluding its acceptance by the server and participation in next games.

2. The method of playing a game according to claim 1, characterized in that questions and answers are transmitted from the server to a user's device in the form of images of questions and answers on the server page and/or their sound recording.

3. The method of playing a game according to claim 1, characterized in that figures are used as symbols.

4. The method of playing a game according to claim 1, characterized in that letters are used as symbols.

5. The method of playing a game according to claim 1, characterized in that images are used as symbols.

6. The method of playing a game according to claim 1, characterized in that in storing codes of products on sale in the data base of the server with the installed game software, the type of a product for sale is stored in addition, which should be entered into the code in the form of a definite preset symbol, and when checking the relevancy of a user's code to the code of products on sale in the server, the user's code is additionally checked for its compliance with the definite preset symbol; and if the definite preset symbol from the user's code is different from the definite preset symbol for the type of a product for sale, then the game with that user's device is interrupted, and if the definite preset symbol of the user's code corresponds to the definite preset symbol of that product for sale, then the game with that user's device continues.

7. The method of playing a game according to claim 1, characterized in that a personal computer with a modem is used as a user's device.

8. The method of playing a game according to claim 1, characterized in that equipment of interactive television is used as a user's device.

9. The method of playing a game according to claim 1, characterized in that a phone provided with means for connecting to the Internet is used as a user's device.

10. The method of playing a game according to claim 1, characterized in that a random code is stored in the server within a preset time interval; after which another random code should be randomly generated, having the symbols number and type that correspond to the number and types of code symbols on the products for sale, and that another random code is stored in the server.

11. The method of playing a game according to claim 1, characterized in that the time for transmitting a reply from a user's device to the server is limited by a preset value, and an additional message is introduced, informing about the limitation of the time, when transmitting a question from the server to the user's device.

12. The method of playing a game according to claim 1, characterized in that food stuffs are used as products on sale.

13. The method of playing a game according to claim 1, characterized in that printed matter is used as products on sale.

14. The method of playing a game according to claim 1, characterized in that garments are used as products on sale.

* * * * *